Aug. 31, 1937.    O. N. BRYANT    2,091,669
ELASTIC FLUID TURBINE
Filed Sept. 7, 1935    2 Sheets-Sheet 1
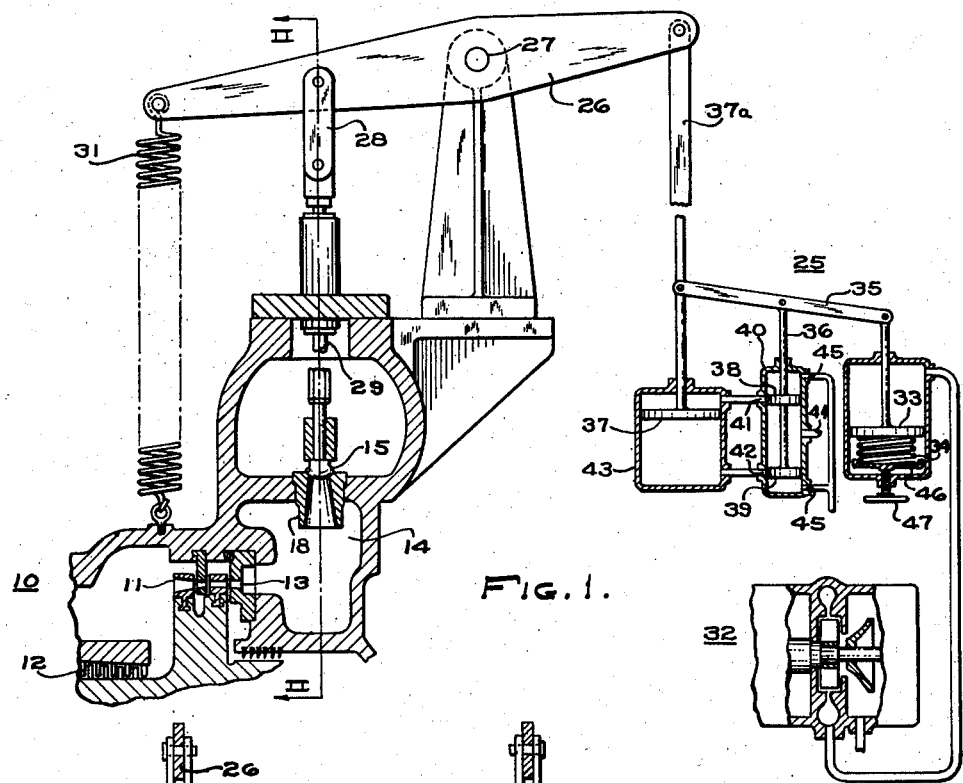
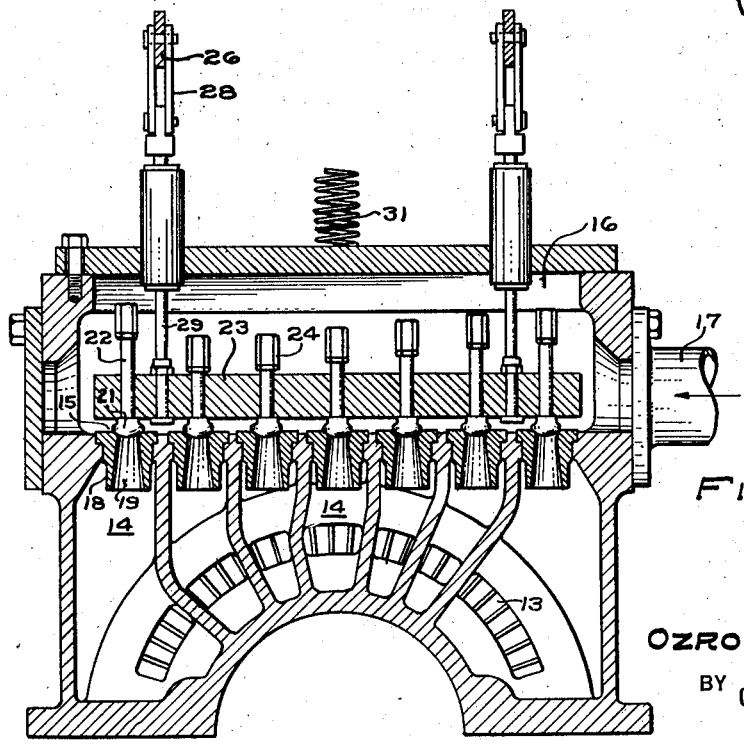
INVENTOR
OZRO N. BRYANT
BY
ATTORNEY Aug. 31, 1937.    O. N. BRYANT    2,091,669
ELASTIC FLUID TURBINE
Filed Sept. 7, 1935    2 Sheets-Sheet 2
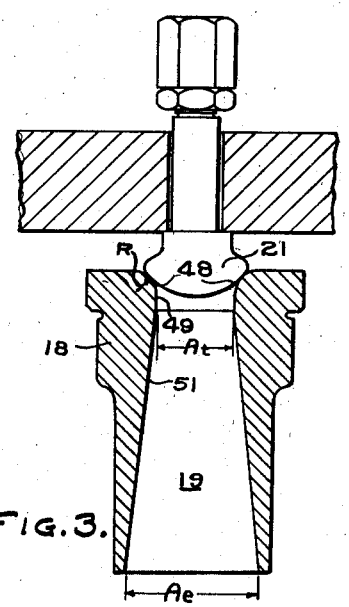
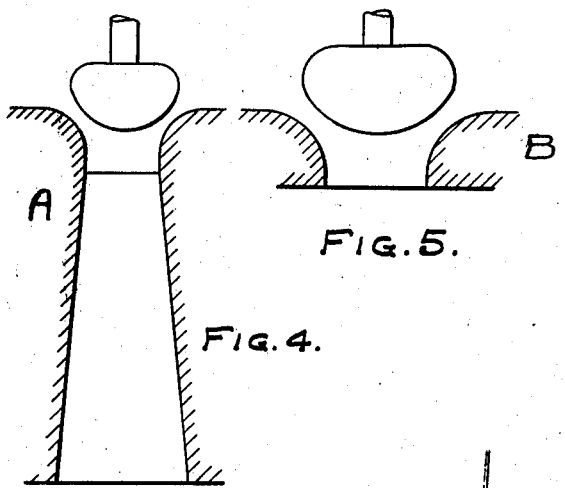
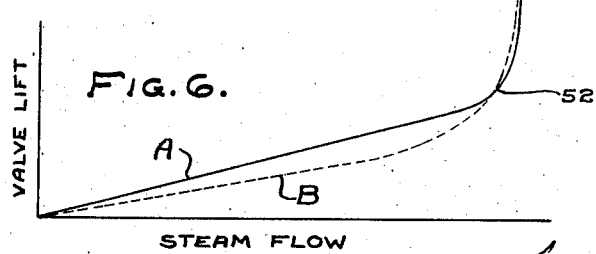
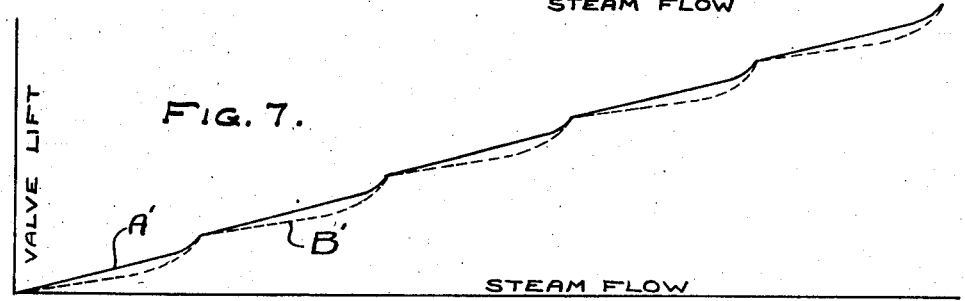
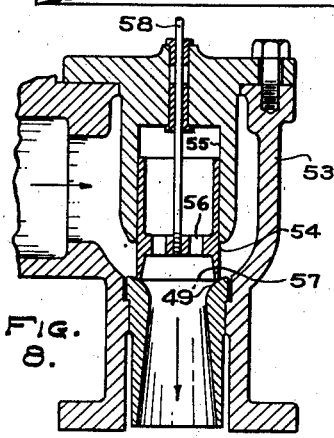
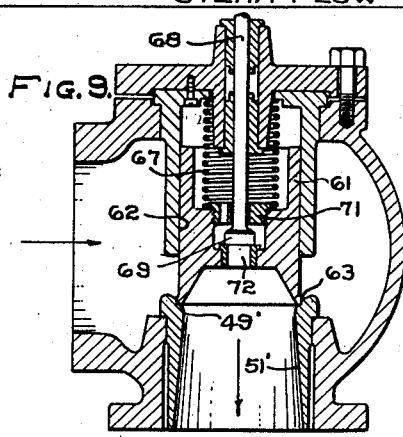
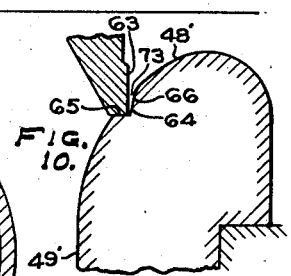
INVENTOR
Ozro N. Bryant.
BY
ATTORNEY Patented Aug. 31, 1937

2,091,669

UNITED STATES PATENT OFFICE 2,091,669

ELASTIC FLUID TURBINE

Ozro N. Bryant, Prospect Park, Pa., assignor to Westinghouse Electric & Manufacturing Company, East Pittsburgh, Pa., a corporation of Pennsylvania Application September 7, 1935, Serial No. 39,551

3 Claims. (Cl. 137—158)

My invention relates to prime mover apparatus, more particularly to an elastic fluid turbine and the means for controlling the admission of motive fluid thereto, and it has for an object to provide improved apparatus.

It is an object of my invention to provide prime mover apparatus having improved governing characteristics.

A more particular object is to provide an elastic fluid turbine in which the variation in motive fluid admission is more nearly proportional to governor travel than in prior constructions.

Another object is to provide an elastic fluid turbine having an admission valve construction requiring less force to operate it, so that a smaller valve operating mechanism may be used.

As is well known in the art, the flow of steam through a valve is substantially proportional to the valve opening as long as the ratio of the absolute pressure on the discharge side of the valve to the absolute pressure on the inlet side of the valve is not above a certain value termed the critical pressure ratio. For the purpose of the present specification, the absolute pressure on the discharge side corresponding to the critical pressure ratio, will be termed the "critical pressure". This meaning is to be distinguished from other meanings sometimes given this term. For saturated steam, the critical pressure is 58% of the absolute inlet pressure, and for superheated steam it decreases, with increase in superheat, until it reaches about 52%. As the discharge pressure exceeds the critical pressure, the increments of valve opening become greater for equal increments of fluid flow. Various expedients have been adopted for providing the larger increments of valve opening. For example, in a cage type of valve, the ports in the cage increase in width as the valve moves toward open position. Such construction is costly because of the larger size and greater lift of the valve that is required.

In accordance with my invention, I provide an elastic fluid turbine having a valve structure comprising a diffuser passage at the outlet of the valve proper and so arranged as to convert the velocity energy of the motive fluid leaving the valve into pressure of the motive fluid. In a preferred form, a stationary part provides a passage comprising a rounded inlet, a throat, and an expanding passage or diffuser portion, all arranged in alignment. The rounded inlet portion constitutes the valve seat and cooperates with a movable valve member to form the flow controlling portion or valve proper. Thus, the velocity of the fluid passing through the valve proper is directed into the diffuser portion to be converted into pressure.

The provision of the diffuser passage provides, at the throat or downstream side of the valve proper, a pressure equal to the critical pressure even after the pressure beyond the diffuser passage exceeds said critical pressure and until it increases to about 90% of the inlet pressure. Accordingly, the flow through the valve is substantially proportional to valve lift throughout the range just mentioned. As the pressure beyond the diffuser portion exceeds 90%, the pressure at the valve outlet exceeds said critical pressure and the ratio of valve lift to steam flow begins to increase.

The above and other objects are effected by my invention as will be apparent from the following description and claims taken in connection with the accompanying drawings, forming a part of this application, in which:

Fig. 1 is a vertical section, taken longitudinally of the turbine, through the steam chest and high pressure stages of an elastic fluid turbine, and also shows diagrammatically the speed regulating mechanism;

Fig. 2 is a transverse sectional view through the steam chest and nozzle chambers, taken on line II—II of Fig. 1;

Fig. 3 is an enlarged sectional view of a valve;

Figs. 4 and 5 are diagrammatic views showing a valve according to the present invention and a valve according to prior construction, respectively, both having equal maximum flow capacity;

Fig. 6 comprises two curves showing the valve lift-steam flow characteristics of the valves shown in Figs. 4 and 5;

Fig. 7 contains similar curves for a plurality of valves arranged to open and close successively;

Fig. 8 is a sectional view showing a balanced valve embodying my invention;

Fig. 9 is a sectional view of another form of balanced valve particularly suitable for a marine turbine; and, Fig. 10 is an enlarged detail section of a valve shown in Fig. 9.

Referring to the drawings in detail, I show in Fig. 1, an elastic fluid turbine 10 comprising an initial impulse stage 11 and additional reaction stages 12. The impulse stage 11 comprises a plurality of nozzles 13, which are divided into groups as shown in Fig. 2. A separate chamber 14 controlled by a separate valve 15 admits the motive fluid, usually steam, to each group of nozzles. Steam is supplied to the steam chest 16 through a conduit 17. Each valve includes an insert 18 having a steam passage 19 formed therein and a plug or closure 21 cooperating therewith to control the flow of steam. Each plug has a stem 22 extending upwardly through a horizontal bar 23. A nut 24 or other abutment on the stem 22 is adapted to be engaged by the bar as the latter is lifted for moving the plug 21 upwardly in valve opening direction. The nuts 24 are positioned at successively greater distances from their respective plugs 21, so that, as the bar 23 is raised, said bar engages the nuts 24 and raises the plugs 21 in succession.

The bar 23 is operated by a governing mechanism 25 through a lever 26 pivoted at 27, and links 28 and stems 29 connecting the lever to the bar 23. One or more springs 31 are preferably connected to the lever 26 for biasing the bar in valve closing direction.

The governing mechanism 25 may be of any suitable construction, but for the purposes of illustration, I have shown a fluid pressure governor comprising a pump 32, preferably mounted on the turbine shaft, providing a pressure varying as the square of the speed of the turbine. This pressure is imposed on the upper face of a pressure responsive piston 33 biased upwardly by a spring 34. The piston 33 is connected to one end of a lever 35, the latter being connected to a pilot valve 36 and to a rod 37a connecting an operating piston 37 to the lever 26. The pilot valve 36 is disposed in a casing 40 and has piston portions 38 and 39 cooperating with ports 41 and 42 leading to the upper and lower ends of a cylinder 43 in which the operating piston 37 is disposed. The casing 40 is provided with a supply port 44 between the piston portions and with exhaust ports 45 beyond said piston portions. The lower end of the spring 34 bears against a spring holding member 46, the position of which may be adjusted by a handwheel 47 to vary the speed setting of the governing mechanism.

Referring now to Fig. 3, the passage 19 formed in the insert 18 includes a rounded inlet portion 48, a throat 49, and a diverging or diffuser portion 51, all arranged in axial alignment. The throat 49 may represent merely the junction between the rounded inlet and the diffuser portion, but preferably comprises a short section of uniform cross-section. The rounded inlet 48 is preferably formed on a radius R that is equal to at least one-fourth of the diameter of the throat 49. The divergence of the diffuser portion 51 is preferably about 10°, and should not be greater than 12°. The angle referred to is the included angle, that is, the angle between the opposite sides of the passage as appearing in section in Fig. 3. I find that an angle of 15° is too great for satisfactory operation, and that a passage having an angle of 20° will not operate in accordance with my invention. The length of the diverging portion is preferably such that the area of the passage at the outlet end, indicated by $A_e$ is three times the area of the throat indicated at $A_t$. As the expanding passage is reduced in length, the compression or velocity-pressure conversion is reduced. When the length is reduced so that the outlet area is twice the throat area, the compression is only about 80% as much as with a ratio of 3 to 1. If the passage is lengthened to provide a ratio of 4 to 1, the compression is 5% greater than with a ratio of 3 to 1. Accordingly, a ratio of about 3 to 1 is generally the most practical and is usually preferable, but shorter passages will effect the major portion of the benefit of the invention and may be used when necessitated by space limitations.

The rounded inlet 48 also constitutes the valve seat, and the plug 21 is formed with a lower spherical surface cooperating with the rounded inlet to form the valve proper, or flow-controlling portion of the valve aggregate. The radius of said spherical surface is preferably so chosen that, when the plug member 21 is in closed position, the tangent at the point of contact is at an angle of 45° to the centerline or axis of the valve. When the surfaces of the curved inlet and the plug member are formed as described, there is provided therebetween a flow-controlling passage extending at an angle of about 45° to the centerline of the valve, which angle has a sufficient axial component of direction to guide the steam smoothly into the throat 49, and at the same time the width of the passage has a sufficient axial component to cause said width to vary substantially in proportion to movement of the plug 21.

Referring first to the operation of the governing mechanism, an increase in load on the turbine results in a decrease in speed. The fluid pressure developed by the pump 32 and imposed on the piston 33 is simultaneously decreased, so that the spring 34 moves said piston upwardly. The pilot valve 36 is moved upwardly through the lever 35, thereby admitting fluid pressure through the ports 44 and 41 to the upper end of the cylinder 43, and exhausting fluid from the lower end of the cylinder through the ports 42 and the lower port 45. The piston 37 thereupon moves downwardly and, through the lever 26, raises the horizontal bar 23. The pilot valve 36 is moved downwardly at the same time by the lever 35 until it closes the ports 41 and 42 whereupon movement of the piston 37 is terminated. The upward movement of the bar 23 contacts successively with the nuts 24 of the several valves, thereby effecting successive opening of the valves.

Upon a decrease in load, the speed and fluid pressure increase. The piston 33 and pilot valve 36 move downwardly, applying fluid pressure beneath the piston 37 and exhausting fluid from the upper end of the casing 43. The piston 37 moves upwardly, and through the lever 26, moves the horizontal bar 23 downwardly. The valves are now successively moved in closing direction in the reverse order of that in which they were opened. The pilot valve 36 moves upwardly with the piston 37 to close the ports 41 and 42 after the piston has moved to an extent determined by the amount of speed and pressure change. As mentioned above, the flow of steam through a valve varies in proportion to the valve opening as long as the absolute pressure on the discharge side of the valve is not above the critical pressure. For saturated steam, the critical pressure is 58% of the absolute inlet pressure, and for superheated steam, it decreases, with increase in superheat, to about 52%. As the absolute discharge pressure exceeds said critical pressure, increasingly greater increments of valve lift are required to effect equal increments of steam flow.

Referring to the operation of the individual valve, as the plug member 21 leaves its seat, the flow of steam through the valve increases in proportion to the valve lift, or the movement of the plug member 21. The pressure of the steam decreases as it passes through the flow-controlling passage between the plug member 21 and the rounded inlet 48 to the throat 49, and the steam then passes through the diffuser portion 51 in which its pressure is increased to a value which varies with the steam flow, but which is always less than the pressure at the inlet side of the valve.

Upon continued opening movement of the valve, as the absolute pressure of the steam at the outlet of the diffuser portion exceeds the critical pressure, the pressure at the throat or outlet of the valve proper is still equal to the critical pressure, so that the flow continues to vary in proportion to the valve lift. This continues until the pressure at the valve outlet exceeds the critical pressure. At such time, the pressure at the outlet of the diffuser portion has reached about 90 per cent of the inlet pressure, and the valve is passing about 94 per cent of its maximum flow capacity. Beyond this point, the increment of valve lift required for a given increment of steam flow becomes successively greater, and after a short additional movement, the next valve begins to open to provide further increase in steam flow.

In Figs. 4 and 5, I show the relative dimensions of a valve A with a diffuser portion and a valve B without a diffuser portion, respectively, the maximum flow capacity of the two valves being equal. The diffuser portion of the valve A has an angle of divergence of 10° and the area of the diffuser outlet is 3.16 times the area of the throat. Valve B has 2.17 times as great an unbalanced area and about twice as great a lift as valve A for the same maximum flow and pressure loss.

The relation of valve lift to steam flow of the valve A is shown by the curve A of Fig. 6, and the relation of valve lift to steam flow of the valve B is shown by the curve B of Fig. 6. It will be noted that for the smaller steam flows, a greater valve lift for a given steam flow is required for the valve A due to the smaller dimensions of the valve proper. As the steam flow approaches its maximum value or the capacity of the valve, however, it will be noted that the valve lift of the valve A for a given increase of steam flow is considerably less than that of the valve B. In an embodiment of the invention such as shown in Figs. 1 to 3, when the valve lift reaches the point of the curve indicated at 52, the next valve begins to open so that only a portion of the curve to the point 52 is actually used. It will be apparent that the curve A approaches a straight line much closer than the curve B. In Fig. 7 is shown a curve A' representing the relation of valve lift to steam flow for a group of valves having diffuser portions as in Fig. 4, and a similar curve B' for a group of valves without diffuser portions, as shown in Fig. 5. It will again be apparent that a group of valves having diffuser portions provide variation of steam flow more nearly in proportion to valve lift or valve movement.

In Fig. 8, I show a balanced type of valve, 53, and a diffuser portion in accordance with my invention, which valve is particularly suitable for small turbines in which a single valve controls the admission of motive fluid to the turbine. The movable valve member 54 is of cylindrical form, and is movable in a cylindrical bore 55 formed in a stationary part of the valve. It is formed with openings 56 through which the pressure above and below the piston is balanced. The operation of this embodiment is substantially the same as that of Figs. 1 to 3 and the description thereof need not be repeated. It has a lower edge 57 seating against the rounded inlet 49' in a manner similar to Figs. 1 to 3. The movable valve member 54 is connected through a stem 58 to a suitable governing mechanism responsive to the speed of the turbine such as the governing mechanism shown in Fig. 1.

The embodiment shown in Figs. 9 and 10 is particularly suitable for marine work in that it is adapted to provide close regulation of a small quantity of motive fluid for cruising speeds. It includes a cylindrical valve member 61 disposed in a cylindrical bore 62 formed in a stationary part of the valve. At its lower end, it is formed with an outer cylindrical surface 63. The rounded inlet 48' of the valve passage is formed with a recess 64, having a horizontal surface 65 and an upwardly diverging or conical side wall 66, for receiving the lower end of the valve member 61, the latter being adapted to seat against the horizontal surface 65.

The valve member 61 is biased in valve closing direction by a spring 67, and it is actuated in valve opening direction by a stem 68 through a pilot valve 69. The latter is adapted to abut a collar 71 carried by the valve member 61 for moving the same in valve opening direction, and to close a pressure-equalizing opening 72 in the valve member upon movement in valve closing direction.

As the valve member 61 moves upwardly, the width of the flow controlling passage 73 between the lower edge of the valve member 61 and the diverging wall 66 gradually increases due to the gradual divergence of the wall 66. The movement of said lower edge to the upper end of the diverging wall 66 provides the regulation required for cruising speeds, and further upward movement after leaving the recess 64 provides increase in steam flow at a greater rate for higher speeds.

As in the other embodiments, the steam passes through the rounded inlet 48', the throat 49' and the diffuser passage 51', in which it is recompressed. In the illustrated embodiment, the diffuser portion 51' is of less than optimum length due to space limitations. However, it is of sufficient length to provide the major portion of the maximum benefit of my invention.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with an elastic fluid turbine, of governor mechanism operated by the turbine and having an actuating element which moves in direct proportion to speed change and an elastic fluid admission valve for the turbine including a seat element and a movable plug element connected to the actuating element so as to be movable thereby in direct proportion to speed change, said seat element having a passage which diverges beyond the seat portion thereof at an angle providing velocity-pressure conversion so that a direct linear relation may be preserved between lift of the plug element and flow through the valve for substantially the complete range of valve lift.

2. The combination of an elastic fluid turbine, governor mechanism operated by the turbine and having an actuating element which moves in direct proportion to speed change, admission valve means including a plurality of valves arranged in parallel in the path of elastic fluid flow, each valve including a plug element and a seat element and the passage of the seat element diverging beyond the seat portion thereof at an angle providing velocity-pressure conversion so that a direct linear relation may be preserved between lift of the plug element and steam flow through the valve for substantially the entire range of travel of the plug element, and means providing for successive opening and closing of the plug elements by said actuating element so that the direct linear relations of plug element lift to steam flow for the valves will be arranged in overlapped relation.

3. The combination with an elastic fluid turbine, of regulating mechanism operable automatically in response to an operating condition of the turbine and having an actuating element which moves in direct proportion to change in said operating condition, and an elastic fluid admission valve for the turbine including an element having a passage comprising a rounded inlet portion and a divergent outlet portion arranged coaxially with the inlet portion for converting the velocity of the elastic motive fluid leaving the valve into pressure of said fluid, the angle of divergence of said outlet portion being not greater than 12°, and a plug element movable toward and away from said inlet portion axially thereof for varying the flow of motive fluid therethrough and connected to said actuating element so as to be movable thereby in direct proportion to change in said operating condition, whereby the variation in flow of motive fluid through the valve is substantially proportional to valve lift for substantially the complete range of valve lift.

OZRO N. BRYANT.